(12) United States Patent
Wang

(10) Patent No.: US 9,297,464 B1
(45) Date of Patent: Mar. 29, 2016

(54) AIR PUMP HAVING PIVOTAL ATTACHMENT

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

( * ) Notice: Subject to any disclaimer, the term of this patent is extended or adjusted under 35 U.S.C. 154(b) by 33 days.

(21) Appl. No.: 14/483,242

(22) Filed: Sep. 11, 2014

(51) Int. Cl.
F16K 15/20 (2006.01)
B60S 5/04 (2006.01)
F04B 33/00 (2006.01)

(52) U.S. Cl.
CPC .. *F16K 15/20* (2013.01); *B60S 5/04* (2013.01); *F04B 33/005* (2013.01); *Y10T 137/3584* (2015.04); *Y10T 137/3724* (2015.04)

(58) Field of Classification Search
CPC ..... B60S 5/04; F04B 33/005; Y10T 37/3584; Y10T 37/3724; Y10T 37/5196; Y10T 37/5283
See application file for complete search history.

(56) References Cited

U.S. PATENT DOCUMENTS

| | | | |
|---|---|---|---|
| 5,666,990 A | | 9/1997 | Wu |
| 5,683,234 A | * | 11/1997 | Chuang ................. F04B 33/005 137/223 |
| 5,749,392 A | * | 5/1998 | Glotin ................... F04B 33/005 137/223 |
| 6,105,600 A | | 8/2000 | Wang |
| 6,105,601 A | | 8/2000 | Wang |
| 6,289,920 B1 | | 9/2001 | Wang |
| 6,328,057 B1 | | 12/2001 | Wang |
| 6,843,270 B1 | * | 1/2005 | Wang ....................... B60S 5/04 137/223 |
| 8,720,474 B2 | | 5/2014 | Wang |
| 8,720,475 B2 | | 5/2014 | Wu |

* cited by examiner

Primary Examiner — R. K. Arundale
(74) Attorney, Agent, or Firm — Charles E. Baxley

(57) ABSTRACT

An air valve connecting device includes a housing having an inlet mouth, a sliding member engaged in the housing and having a pathway for receiving the pressurized air from the inlet mouth, a rotary member rotatably engaged with the housing and having two or more compartments each for receiving a gasket and an inflation valve, the rotary member is rotatable relative to the housing for selectively aligning either of the compartments of the rotary member with the chamber of the housing and the sliding member, and a hand grip includes a cam member attached to the housing with a pivot shaft and engaged with the sliding member for forcing the sliding member to force the gaskets to engage with the inflation valves respectively.

9 Claims, 5 Drawing Sheets

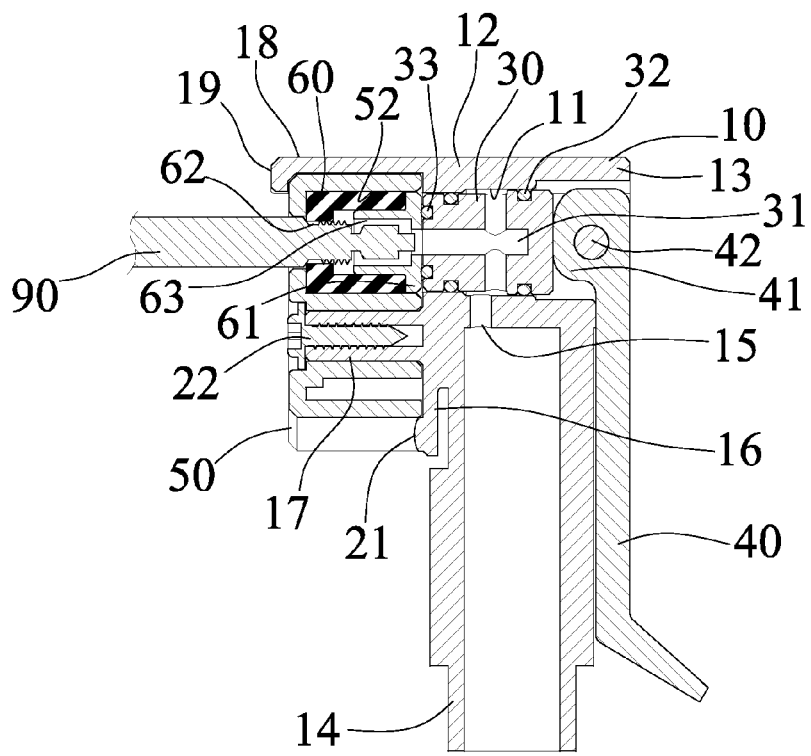
F I G. 3
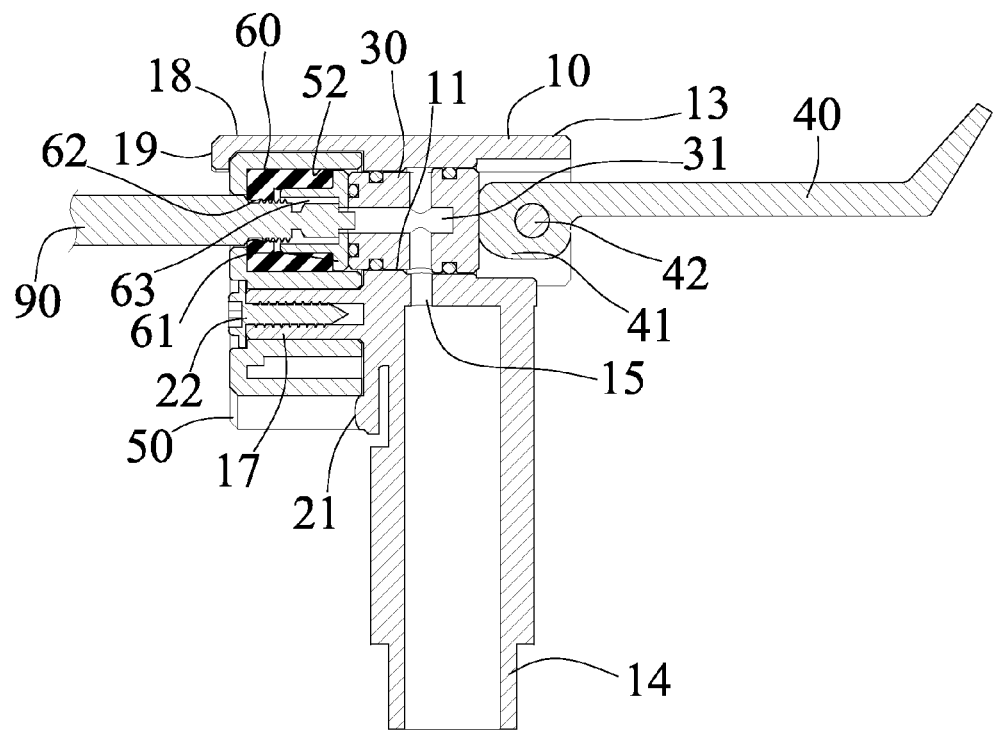
F I G. 4

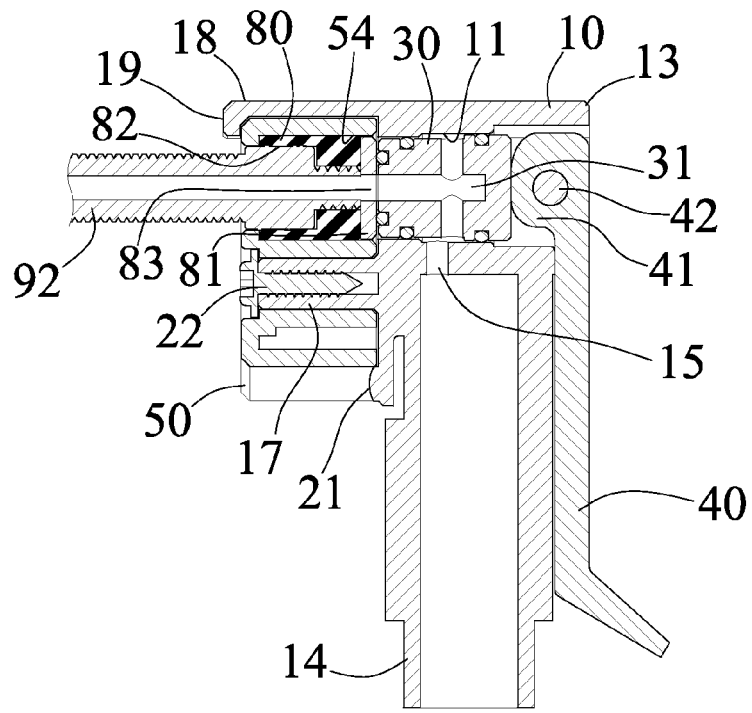
F I G. 7
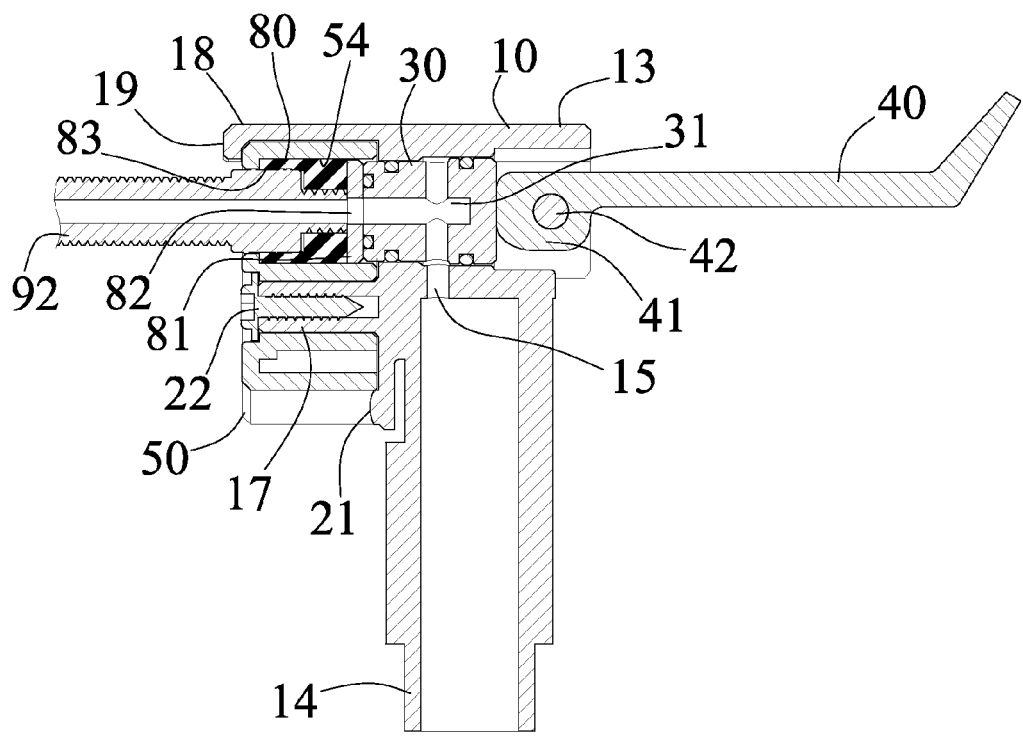
F I G. 8

AIR PUMP HAVING PIVOTAL ATTACHMENT

BACKGROUND OF THE INVENTION

1. Field of the Invention

The present invention relates to an air pump or hand pump device or apparatus, and more particularly to an air pump or hand pump device or apparatus including an improved air valve connecting device or attachment pivotally or rotatably attached or mounted or secured or coupled to the air pump or hand pump and pivotal or movable relative to the air pump or hand pump for easily and quickly and alternatively engaging with different inflation nozzles or tire valves, such as the U.S. type inflation valve, the U.K. or Great British type inflation valve, or the French type inflation valve, or the like.

2. Description of the Prior Art

Typical air valve connecting devices or apparatuses comprise a piston slidably or movably disposed or engaged in a cylinder housing and movable along or relative to the air valve connecting device for generating a pressurized air and for filling or supplying the pressurized air to selectively inflate various kinds of balls, inner tires of the bicycles or the motorcycles or the vehicles, or other inflatable articles with a valve piece.

For example, U.S. Pat. No. 6,105,600 to Wang, U.S. Pat. No. 6,105,601 to Wang, U.S. Pat. No. 6,289,920 to Wang, U.S. Pat. No. 6,328,057 to Wang, and U.S. Pat. No. 7,866,335 to Wang disclose several of the typical hand operated air pumps each also comprising a cylinder housing including a chamber or compartment formed therein for slidably or movably receiving or engaging with a piston which is slidable and movable along or relative to the air valve connecting device for generating a pressurized air and for filling or supplying the pressurized air to selectively inflate various kinds of balls, inner tires of the bicycles or the motorcycles or the vehicles, or other inflatable articles, and normally, a valve piece attachment is further provided and attached or mounted or secured to the air valve connecting device for engaging with the inflatable articles.

However, the valve piece attachment of the typical air valve connecting device or apparatus normally includes a single valve piece for engaging with a single inflation nozzle or tire valve, such as the U.S. type inflation valve, the U.K. or Great British type inflation valve, or the French type inflation valve, or the like, but may not be used to engage with different inflation nozzles or tire valves.

U.S. Pat. No. 5,666,990 to Wu, U.S. Pat. No. 6,683,234 to Chuang et al., U.S. Pat. No. 8,720,474 to Wang, and U.S. Pat. No. 8,720,475 to Wu disclose several other typical hand operated air pumps each also comprising a cylinder housing including a chamber or compartment formed therein for slidably or movably receiving or engaging with a piston which is slidable and movable along or relative to the air valve connecting device for generating a pressurized air and for filling or supplying the pressurized air to selectively inflate various kinds of balls, inner tires of the bicycles or the motorcycles or the vehicles, or other inflatable articles, and a valve piece attachment is further provided and attached or mounted or secured to the air valve connecting device for engaging with different inflatable articles.

However, the valve piece attachment of the typical air valve connecting device or apparatus includes a complicated structure or configuration that may not be used to easily and quickly engage with different inflation nozzles or tire valves.

The present invention has arisen to mitigate and/or obviate the afore-described disadvantages of the conventional attachments for hand air valve connecting devices.

SUMMARY OF THE INVENTION

The primary objective of the present invention is to provide an air valve connecting device including improved attachment pivotally or rotatably attached or mounted or secured or coupled to the air pump or hand pump and pivotal or movable relative to the air pump or hand pump for easily and quickly engaging with different inflation nozzles or tire valves, such as the U.S. type inflation valve, the U.K. or Great British type inflation valve, or the French type inflation valve, or the like.

In accordance with one aspect of the invention, there is provided an air valve connecting device comprising a housing including a chamber formed therein, and including an inlet mouth having an entrance formed in the inlet mouth and communicating with the chamber of the housing for guiding a pressurized air to flow from the inlet mouth into the chamber of the housing, the housing including a pivot axle extended therefrom, a sliding member slidably engaged in the chamber of the housing and extendible out of the chamber of the housing, the sliding member including a pathway formed in the sliding member for selectively aligning with the entrance of the inlet mouth and for receiving the pressurized air from the inlet mouth, a rotary member rotatably engaged with the pivot axle for allowing the rotary member to be rotated relative to the housing, the rotary member including a first compartment and at least one second compartment formed therein, a first gasket and at least one second gasket engaged in the first compartment and the at least one second compartment of the rotary member respectively for engaging with inflation valves respectively, the rotary member being rotatable relative to the housing for selectively aligning either the first compartment or the at least one second compartment of the rotary member with the chamber of the housing and the sliding member, and a hand grip including a cam member partially attached to the housing with a pivot shaft, and the cam member being engaged with the sliding member for selectively forcing and moving the sliding member onto of the chamber of the housing and to force the first and the at least one second gaskets to engage with the inflation valves respectively.

The rotary member includes a first valve piece and at least one second valve piece engaged in the first compartment and the at least one second compartment of the rotary member respectively and engaged with the first and the at least one second gaskets respectively for selectively engaging with the sliding member of the air valve connecting device.

The sliding member includes a sealing ring for selectively engaging with the first valve piece or the at least one second valve piece and for making an air tight seal between the sliding member and the first and the at least one second valve piece respectively for making an air tight seal between the sliding member and the valve piece.

The housing includes an extension extended outwardly therefrom for engaging with the rotary member and for anchoring or retaining the rotary member to the housing. The housing includes a retainer provided on the extension for engaging with the rotary member.

The housing includes a fastener secured to the pivot axle and engaged with the rotary member for retaining the rotary member to the housing and for preventing the rotary member from being disengaged from the housing.

The sliding member includes two sealing rings engaged onto the sliding member and engaged between the sliding member and the housing for making an air tight seal between the sliding member and the housing, and the sealing rings are located on two sides of the pathway of the sliding member for preventing the pressurized air from leaking out through the contacting portion between the sliding member and the housing.

The housing includes a platform provided thereon and located in front of the housing, the pivot axle is extended outwardly from the platform for rotatably engaging with the rotary member and for rotatably attaching or securing the rotary member to the housing and for allowing the rotary member to be rotated relative to the housing. The platform includes a spring biased projection for selectively engaging with the rotary member and for anchoring and positioning the rotary member to the platform and the housing at selected positions.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a cross sectional view of the air valve connecting device taken along lines 3-3 of FIG. 2;

FIGS. 4, 5, 6, 7, 8 are cross sectional views similar to FIG. 3, illustrating the operation of the air valve connecting device;

DETAILED DESCRIPTION OF THE PREFERRED EMBODIMENT

Figure 1:
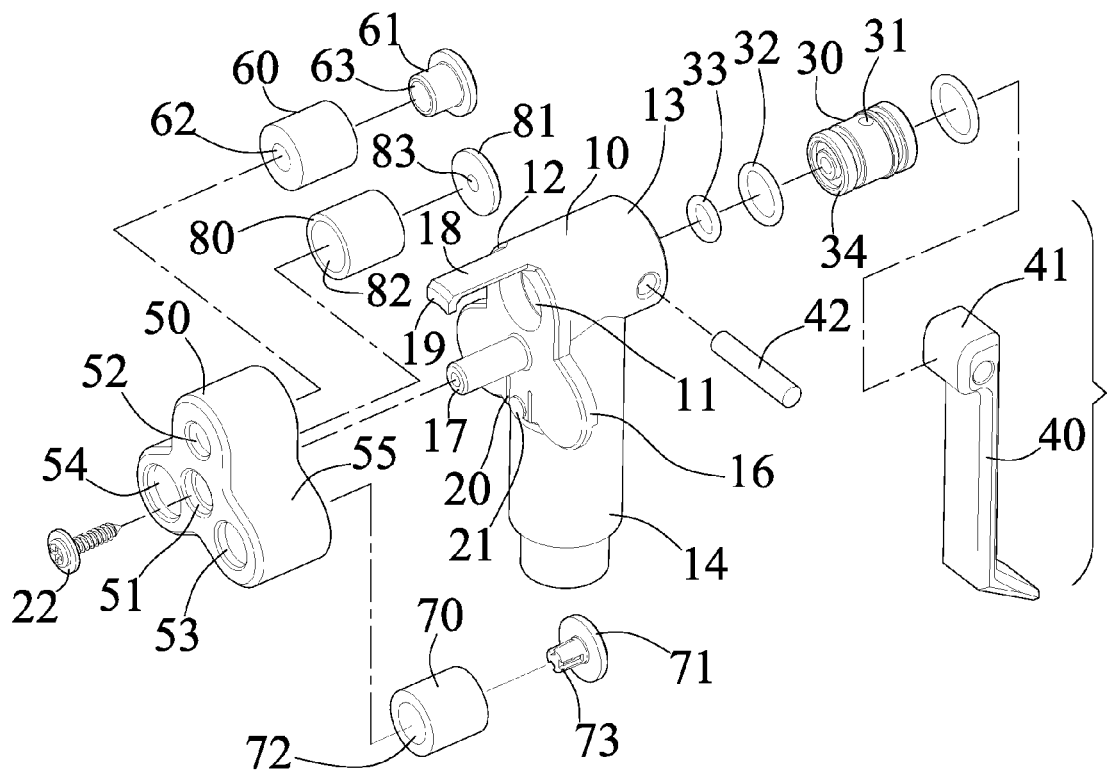
FIG. 1 is a partial exploded view of an air valve connecting device in accordance with the present invention.
Figure 2:
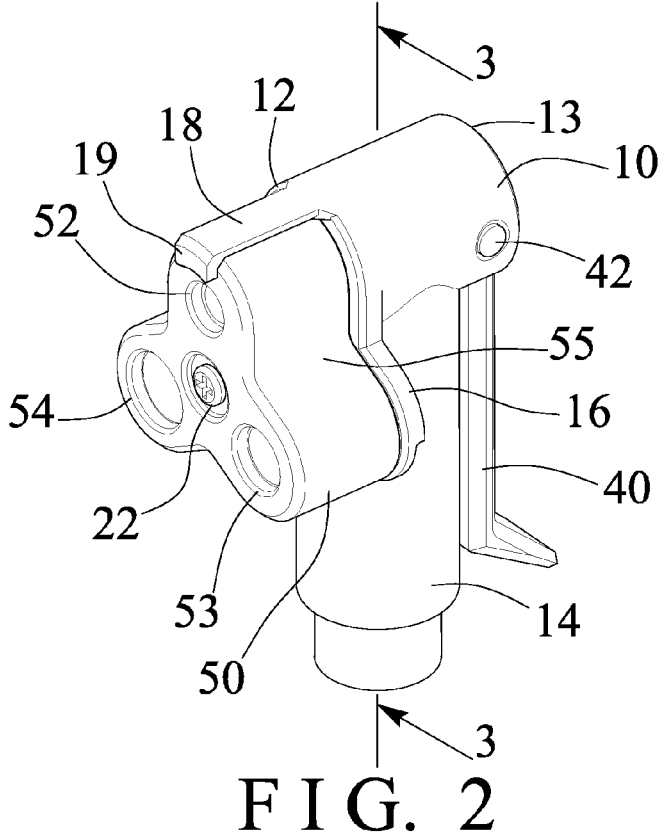
FIG. 2 is a perspective view of the air valve connecting device.

Referring to the drawings, and initially to FIGS. 1-3, an air valve connecting device in accordance with the present invention comprises a head body or housing 10 including a chamber 11 formed therein and opened upwardly or forwardly through a front portion or one end portion 12 of the housing 10 (FIGS. 3-8) and also opened downwardly or rearwardly through a rear portion or the other end portion 13 of the housing 10 (FIGS. 3-8), the housing 10 includes a stud or extension or inlet mouth 14 extended downwardly and outwardly therefrom for connecting or coupling to a pressurized air reservoir or hand-held air pump (not illustrated) or the like with such as hoses (not illustrated) for receiving the pressurized air from the air reservoir or hand-held air pump (not illustrated) or the like, and includes an air passage or orifice or entrance 15 formed therein, such as formed between and communicating with the inlet mouth 14 and the chamber 11 of the housing 10 for guiding and introducing the pressurized air to flow from the inlet mouth 14 into the chamber 11 of the housing 10.

The above-described structure or configuration for the connection mechanism or status between the inlet mouth 14 and the air reservoir or hand-held air pump (not illustrated) is typical and is not related to the present invention and will not be described in further details. The air valve connecting device or attachment further includes a valve piece or shank or sliding member 30 slidably or movably disposed or engaged into the chamber 11 of the housing 10, and the sliding member 30 includes a passage or manifold or orifice or opening or conduit or pathway 31 formed in the sliding member 30 for selectively aligning with or engaging with or communicating with the entrance 15 of the inlet mouth 14, best shown in FIGS. 3-8, and for selectively receiving the pressurized air from the air reservoir or hand-held air pump (not illustrated) or the like.

The air valve connecting device or attachment further includes one or more (such as two) sealing rings 32 attached or mounted or secured or engaged onto the sliding member 30, and contacted or engaged between the sliding member 30 and the housing 10 for selectively making a water or air tight seal between the sliding member 30 and the housing 10, and the sealing rings 32 are disposed or located on the two sides of the pathway 31 of the sliding member 30 for preventing the pressurized air from leaking out through the adjacent or contact portion between the sliding member 30 and the housing 10. Another sealing ring 33 is disposed or attached or mounted or secured or engaged onto the front portion or one end portion 34 of the sliding member 30. An actuating handle or knob or hand grip 40 includes a cam member 41 partially disposed or received or engaged in the chamber 11 of the housing 10 and pivotally or rotatably attached or mounted or secured to the housing 10 with a pivot shaft 42, and the cam member 41 is contacted or engaged with the sliding member 30 for selectively forcing or moving the sliding member 30 out of the chamber 11 of the housing 10.

The housing 10 further includes a table or base board or platform 16 formed or provided thereon, such as located on the front or one end portion 12 of the housing 10 and substantially perpendicular to the housing 10 and parallel to the inlet mouth 14, and the chamber 11 of the housing 10 is also opened outwardly or forwardly through the platform 16, best shown in FIG. 1, and includes a spindle or pivot axle 17 extended outwardly or forwardly from the platform 16, and offset from the chamber 11 of the housing 10, and includes a stud or extension 18 also extended outwardly or forwardly from the platform 16 and located above the chamber 11 of the housing 10 and the pivot axle 17, and includes a hook or retainer 19 formed or provided or extended from the extension 18, and includes one or more (such as two) grooves or slots 20 formed in the platform 16 and located below the pivot axle 17 and the extension 18 for forming or defining a spring biased blade or projection 21 on the platform 16.

An attachment or housing or rotary member 50 includes a center hole 51 formed therein for pivotally or rotatably receiving or engaging with the pivot axle 17 and for allowing the rotary member 50 to be pivoted or rotated relative to the housing 10, the rotary member 50 is preferable, but not necessary contacted or engaged with the platform 16 of the housing 10, and a screw or bolt or fastener 22 may be attached or mounted or secured to the pivot axle 17 and contacted or engaged with the rotary member 50 for solidly and stably anchoring or retaining or positioning the rotary member 50 to the housing 10 and for preventing the rotary member 50 from being disengaged from the housing 10. The hook or retainer 19 at the extension 18 of the housing 10 may also be contacted or engaged with the rotary member 50 for further solidly and stably anchoring or retaining or positioning the rotary member 50 to the housing 10.

The rotary member 50 includes one or more (such as three) compartments 52, 53, 54 formed therein and located around the pivot axle 17 and the center hole 51 of the rotary member 50, and preferably equally spaced from each other, and three elastic grasping members or mouths or gaskets 60, 70, 80 and three valve pieces 61, 71, 81 are attached or mounted or secured or received or contained or engaged in the compartments 52, 53, 54 of the rotary member 50 respectively, and the gaskets 60, 70, 80 each include a bore 62, 72, 82 formed therein for selectively receiving or engaging with the inflation nozzles or tire valves 90, 91, 92, such as the French type inflation valve 90 (FIGS. 3, 4), the U.S. type inflation valve 91 (FIGS. 5, 6), or the U.K. or Great British type inflation valve 92 (FIGS. 7, 8) or the like, and the valve pieces 61, 71, 81 each include a pathway or conduit or manifold or passage 63, 73, 83 formed therein and communicating with the bore 62, 72, 82 of the gaskets 60, 70, 80 respectively. The rotary member 50 is rotatable relative to the housing 10 for selectively aligning either of the compartments 52, 53, 54 of the rotary member 50 and either of the gaskets 60, 70, 80 with the chamber 11 of the housing 10 and the sliding member 30.

As shown in FIGS. 3-8, the passages 63, 73, 83 of the valve pieces 61, 71, 81 are communicating with the bore 62, 72, 82 of the gaskets 60, 70, 80 respectively, and to be selectively aligned or engaged with or communicated with the chamber 11 of the housing 10 for receiving the pressurized air from chamber 11 of the housing 10 and for selectively supplying the pressurized air to the inflation valves 90, 91, 92 respectively. The valve pieces 61, 71, 81 are provided for being contacted or engaged with the sliding member 30 selectively and alternatively and arranged for allowing the valve pieces 61, 71, 81 to be selectively forced and moved by the sliding member 30, and thus for allowing the gaskets 60, 70, 80 to be selectively depressed or compressed or squeezed or deformed by the valve pieces 61, 71, 81 in order to grip or grasp or hold or retain the inflation valve 90, 91, 92 to the rotary member 50, in which the gaskets 60, 70, 80 are made of soft or elastic materials, such as rubber, plastic or other synthetic materials having a suitable or predetermined softness or resilience for being selectively depressed or compressed or squeezed or deformed by the valve pieces 61, 71, 81.

Figure 5:
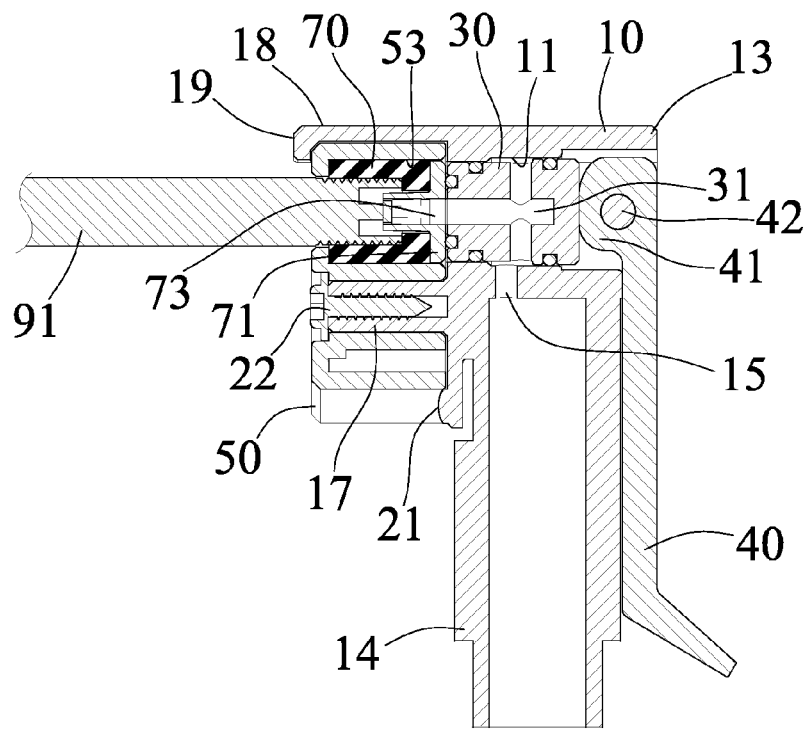
Figure 6:
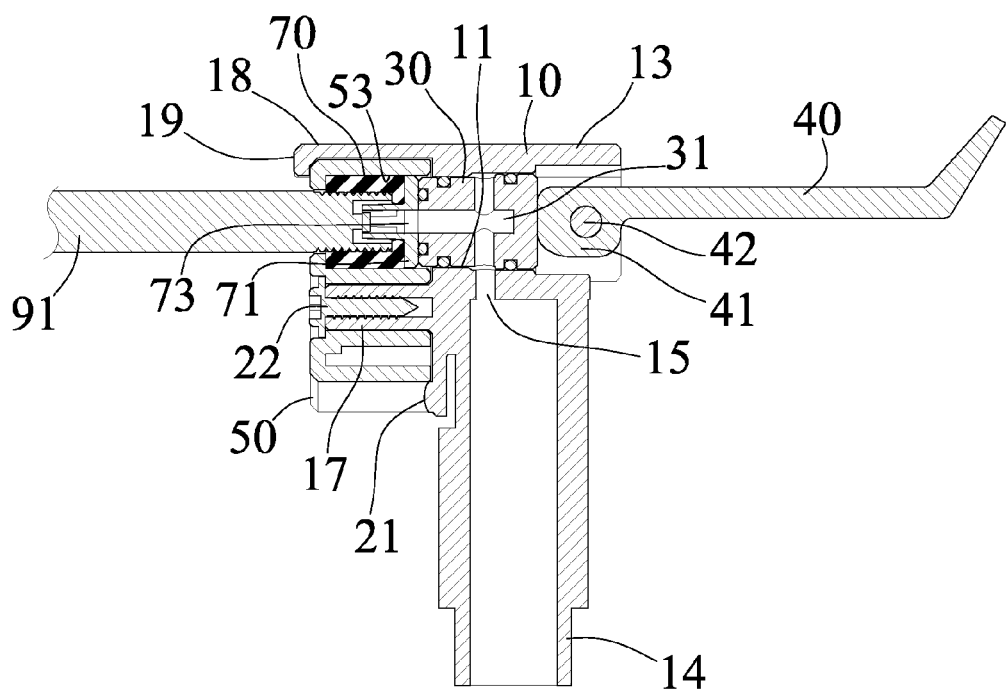

In operation, as shown in FIGS. 3, 5, 7, after the inflation valve 90, 91, 92 has been engaged into the bore 62, 72, 82 of the gasket 60, 70, 80 respectively, the hand grip 40 may be pivoted or rotated relative to the housing 10, the cam member 41 of the hand grip 40 may force and move the sliding member 30 for selectively forcing or moving the sliding member 30 out of the chamber 11 of the housing 10 and to force and move the valve pieces 61, 71, 81 to depress or compress or squeeze or deform the gaskets 60, 70, 80 and to grip or grasp or hold or retain the inflation valve 90, 91, 92 to the rotary member 50. The sealing ring 33 will be disposed or engaged between the sliding member 30 and the valve piece 61, 71, 81 for selectively making a water or air tight seal between the sliding member 30 and the valve piece 61, 71, 81 and for preventing the pressurized air from leaking out through the adjacent or contact portion between the sliding member 30 and the valve piece 61, 71, 81. As shown in FIGS. 3-8, the spring biased projection 21 of the platform 16 or of the housing 10 may be engaged with the rotary member 50 for anchoring or retaining or positioning the rotary member 50 to the platform 16 or the housing 10 at the required or selected position.

Figure 9:
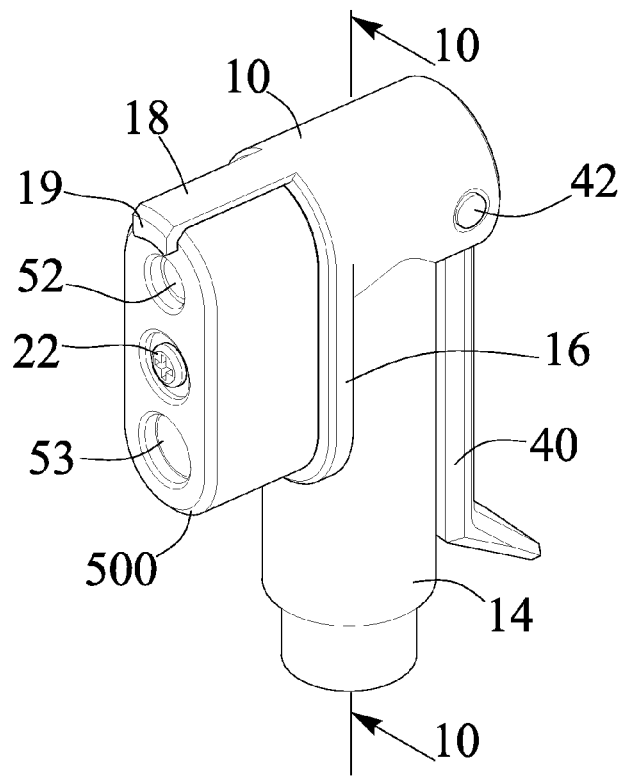
FIG. 9 is another perspective view similar to FIG. 2, illustrating the other arrangement of the air valve connecting device.
Figure 10:
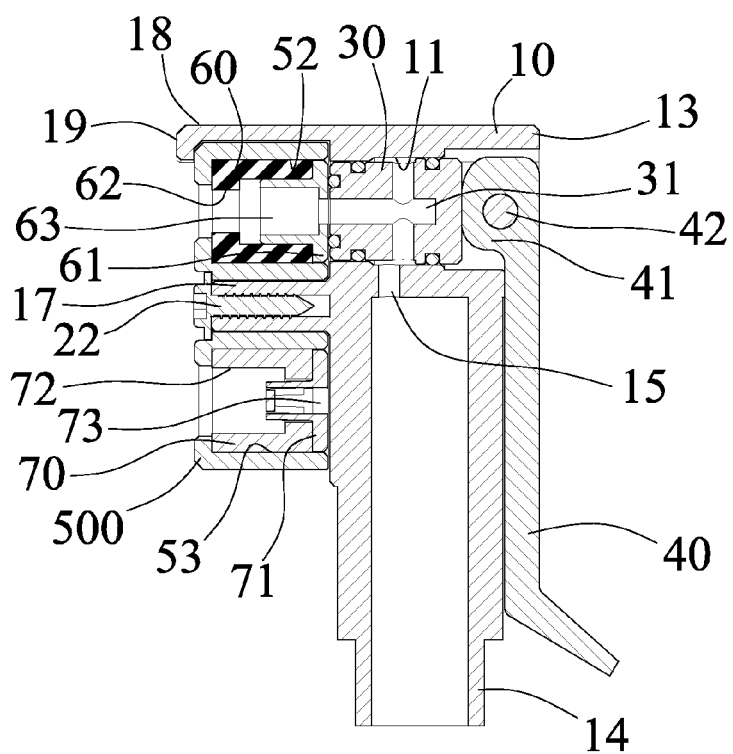
FIG. 10 is a cross sectional view of the air valve connecting device taken along lines 10-10 of FIG. 9.

For example, the rotary member 50 may include one or more (such as three) depressions or recesses or notches 55 formed therein (FIGS. 1-2), and arranged or located opposite to the compartments 52, 53, 54 of the rotary member 50 and/or the gaskets 60, 70, 80 respectively, for selectively receiving or engaging with the spring biased projection 21 of the platform 16 or of the housing 10 and for anchoring or retaining or positioning the respective gasket 60, 70, 80 or valve piece 61, 71, 81 in front of the sliding member 30. Alternatively, as shown in FIGS. 9 and 10, the rotary member 500 may include one or more (such as two) compartments 52, 53 formed therein and located around the pivot axle 17 and opposite to each other for selectively receiving or engaging with the gaskets 60, 70 and the valve pieces 61, 71 respectively and for selectively receiving or engaging with different inflation valves. The rotary member 500 is also rotatable relative to the housing 10 for selectively aligning either the compartments 52, 53 with the chamber 11 of the housing 10 and the sliding member 30.

Accordingly, the air valve connecting device or hand pump in accordance with the invention includes an improved attachment pivotally or rotatably attached or mounted or secured or coupled to the air pump or hand pump and pivotal or movable relative to the air pump or hand pump for easily and quickly engaging with different inflation nozzles or tire valves, such as the U.S. type inflation valve, the U.K. or Great British type inflation valve, or the French type inflation valve, or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a chamber formed therein, and including an inlet mouth having an entrance formed in said inlet mouth and communicating with said chamber of said housing for guiding a pressurized air to flow from said inlet mouth into said chamber of said housing, said housing including a pivot axle extended therefrom,
   a sliding member slidably engaged in said chamber of said housing and extendible out of said chamber of said housing, said sliding member including a pathway formed in said sliding member for selectively aligning with said entrance of said inlet mouth and for receiving the pressurized air from said inlet mouth,
   a rotary member rotatably engaged with said pivot axle for allowing said rotary member to be rotated relative to said housing, said rotary member including a first compartment and at least one second compartment formed therein,
   a first gasket engaged in said first compartment of said rotary member for engaging with a first inflation valve, said rotary member being rotatable relative to said housing for selectively aligning said first compartment of said rotary member with said chamber of said housing and said sliding member,
   at least one second gasket engaged in said at least one second compartment of said rotary member for engaging with a second inflation valve, said rotary member being rotatable relative to said housing for selectively aligning said at least one second compartment of said rotary member with said chamber of said housing and said sliding member, and
   a hand grip including a cam member partially attached to said housing with a pivot shaft, and said cam member being engaged with said sliding member for selectively forcing and moving said sliding member onto of said chamber of said housing and to force said first and said at least one second gaskets to engage with said inflation valves respectively.

2. The air valve connecting device as claimed in claim 1, wherein said rotary member includes a first valve piece and at least one second valve piece engaged in said first compartment and said at least one second compartment of said rotary member respectively and engaged with said first and said at least one second gaskets respectively for selectively engaging with said sliding member.

3. The air valve connecting device as claimed in claim 2, wherein said sliding member includes a sealing ring for selectively engaging with said first valve piece or said at least one second valve piece and for making an air tight seal between said sliding member and said first and said at least one second valve piece respectively.

4. The air valve connecting device as claimed in claim 1, wherein said housing includes an extension extended outwardly therefrom for engaging with said rotary member.

5. The air valve connecting device as claimed in claim 4, wherein said housing includes a retainer provided on said extension for engaging with said rotary member.

6. The air valve connecting device as claimed in claim 1, wherein said housing includes a fastener secured to said pivot axle and engaged with said rotary member for retaining said rotary member to said housing and for preventing said rotary member from being disengaged from said housing.

7. The air valve connecting device as claimed in claim 1, wherein said sliding member includes two sealing rings engaged onto said sliding member and engaged between said sliding member and said housing for making an air tight seal between said sliding member and said housing, and said sealing rings are located on two sides of said pathway of said sliding member.

8. The air valve connecting device as claimed in claim 1, wherein said housing includes a platform provided thereon and located in front of said housing, said pivot axle is extended outwardly from said platform.

9. The air valve connecting device as claimed in claim 8, wherein said platform includes a spring biased projection for selectively engaging with said rotary member and for anchoring said rotary member to said platform and said housing at selected positions.

\* \* \* \* \*